United States Patent
Bergmann

(10) Patent No.: US 11,352,050 B2
(45) Date of Patent: Jun. 7, 2022

(54) METHOD FOR OPERATING A STEERING SYSTEM

(71) Applicant: ZF Automotive Germany GmbH, Alfdorf (DE)

(72) Inventor: Philipp Bergmann, Rheine (DE)

(73) Assignee: ZF Automotive Germany GmbH, Alfdorf (DE)

( * ) Notice: Subject to any disclaimer, the term of this patent is extended or adjusted under 35 U.S.C. 154(b) by 68 days.

(21) Appl. No.: 16/649,479

(22) PCT Filed: Sep. 17, 2018

(86) PCT No.: PCT/EP2018/075004
§ 371 (c)(1),
(2) Date: Mar. 20, 2020

(87) PCT Pub. No.: WO2019/057650
PCT Pub. Date: Mar. 28, 2019

(65) Prior Publication Data
US 2020/0298902 A1  Sep. 24, 2020

(30) Foreign Application Priority Data

Sep. 20, 2017  (DE) .......................... 102017121821.1

(51) Int. Cl.
*B62D 5/04* (2006.01)
*B62D 3/12* (2006.01)
*B62D 5/00* (2006.01)

(52) U.S. Cl.
CPC ............ *B62D 5/046* (2013.01); *B62D 3/126* (2013.01); *B62D 5/0421* (2013.01); *B62D 5/005* (2013.01)

(58) Field of Classification Search
CPC ....... B62D 5/046; B62D 3/126; B62D 5/0421
See application file for complete search history.

(56) References Cited

U.S. PATENT DOCUMENTS

| 4,813,294 | A  | * | 3/1989 | Ukai | .................. | B62D 5/10 |
|-----------|----|---|--------|------|---|-----------|
| | | | | | | 180/400 |
| 5,924,518 | A  | * | 7/1999 | D'Onofrio | ............... | B62D 5/04 |
| | | | | | | 180/444 |
| 8,960,037 | B2 | * | 2/2015 | Yamanaka | ........... | B62D 5/0448 |
| | | | | | | 74/424.81 |
| 9,610,659 | B2 | * | 4/2017 | Yamanaka | .............. | B23P 19/04 |

(Continued)

FOREIGN PATENT DOCUMENTS

DE  102008001237 B3  4/2009
DE  102008001179 A1  10/2009
(Continued)

*Primary Examiner* — Jacob D Knutson
(74) *Attorney, Agent, or Firm* — Robert James Harwood

(57) ABSTRACT

A method is proposed for operating a steering system of a motor vehicle, in particular an electromechanically supported steering system. First, at least one first virtual magnet and one second virtual magnet are provided in the steering system of the motor vehicle. A virtual magnetic force exerted on each other by the multiple virtual magnets is determined. A setpoint force that is to be applied to a lower part of the steering system is estimated and an auxiliary force with which a servo motor of the steering system acts on the lower part of the steering system is determined from the specified virtual magnetic force and the estimated setpoint force.

20 Claims, 6 Drawing Sheets

(56) References Cited

U.S. PATENT DOCUMENTS

2011/0153159 A1\* 6/2011 Kulkarni .................. B62D 5/04
  701/41
2016/0221601 A1   8/2016 Barthomeuf et al.

FOREIGN PATENT DOCUMENTS

| DE | 102011105064 A1 | | 12/2012 |
|----|-----------------|---|---------|
| EP | 3260354 A1 | | 12/2017 |
| KR | 20130133327 A | * | 12/2013 |
| KR | 20180006760 A | * | 1/2018 |
| KR | 20200107484 A | * | 9/2020 |
| WO | 2016143454 A1 | | 11/2017 |

\* cited by examiner

METHOD FOR OPERATING A STEERING SYSTEM

CROSS-REFERENCE TO RELATED APPLICATION

This application is a national stage of International Application No. PCT/EP2018/075004, filed Sep. 17, 2018, the disclosure of which is incorporated herein by reference in its entirety, and which claimed priority to German Patent Application No. 102017121821.1, filed Sep. 20, 2017, the disclosure of which is incorporated herein by reference in its entirety.

TECHNICAL FIELD

The invention relates to a method for operating a steering system of a motor vehicle, in particular an electromechanically supported steering system.

BACKGROUND

Electromechanically supported steering systems, i.e. steering systems in which a servo motor assists the driver in steering the motor vehicle, perform various tasks in motor vehicles. One task is to reduce the steering force required for the driver to steer the vehicle in the desired direction. The servo motor supports the driver in this depending on the speed of the vehicle, the angle of rotation of the steering column, the torque acting on the steering column, the rotational speed of the steering column and other parameters.

Such steering systems usually have a certain steering feel that is perceived by the driver, which depends mainly on the mechanical components of the steering system and the control of the supporting servo motor. In particular, the control feel varies depending on the aforementioned parameters.

A well-known way to influence the steering feel is to set the setpoint value for return speed, return time and thus for return distance and return position of the steering wheel by means of mathematical functions. Another known way to influence the control feel is to model a virtual linear spring-mass damper system. However, this system operates purely passively and does not provide an active way to influence the control feel.

SUMMARY

The object of the invention is therefore to create a method that provides the possibility to easily adjust the control feel of steering systems.

The object is achieved according to the invention by a method of the type mentioned above, with the steps: provide at least one first and one second virtual magnet in the steering system of the motor vehicle; determine a virtual magnetic force that the multiple virtual magnets exert on each other; estimate a setpoint force to be applied to a lower part of the steering system; and determine an auxiliary force with which a servo motor of the steering system acts on the lower part of the steering system from the specified virtual magnetic force and the estimated setpoint force.

The virtual magnets that are present in a simulation thus influence the force with which the servo motor acts on the lower part of the steering system and thus also the steering feel. The return speed, the return time and the return distance can be easily adjusted and actively influenced by the choice of the position and magnetic properties of the virtual electromagnets.

The first virtual magnet is preferably provided at a fixed position in the steering system. A fixed position means that the position is not determined depending on the situation but is the same across applications. In particular, the first virtual magnet is not movable in relation to the motor vehicle.

According to one aspect of the invention, the second virtual magnet is provided at a variable position in the steering system. It is envisaged that the second virtual magnet is firmly attached to a component of the steering system and is movable with it. Thus, if the second virtual magnet is provided, for example, on a track rod, the second virtual magnet follows the movements of the track rod.

In particular, it is provided that the virtual magnets are movable relative to each other along a one-dimensional path. This makes it particularly easy to calculate the virtual magnetic force that the two virtual magnets exert on each other.

Another aspect provides that the variable position of the second virtual magnet is determined based on the operating parameters of the motor vehicle, in particular of the steering system. The operating parameters include a speed of the motor vehicle, an acceleration of the motor vehicle, an engine condition, a position of the track rod, a speed of the track rod, an acceleration of the track rod, a rotation angle of a steering column, a rotational speed of the steering column and/or a rotational acceleration of the steering column. As a result, the control feel can be adjusted according to the driving situation.

In one embodiment of the invention, the first virtual magnet is provided as a virtual electromagnet. The magnetic properties of the first virtual magnet (e.g. magnetic field strength, magnetic flux density and magnetic polarity) can be easily adjusted by virtual energization.

Preferably, a virtual electromagnet is provided as the second virtual magnet. The second virtual magnet may have predefined magnetic properties, which are in particular fixed.

A permanent magnet can be used as the first virtual magnet if the second virtual magnet is a virtual electromagnet. In this case, magnetic properties of the second virtual magnet are adjustable. The magnetic properties of the second virtual magnet are determined in particular based on the operating parameters of the motor vehicle. The magnetic properties include at least one of the following variables: magnetic field strength, magnetic flux density, magnetic polarity and variables resulting from these magnetic properties, in particular magnetic energy, magnetic remanence and reluctance. The operating parameters include a speed of the motor vehicle, an acceleration of the motor vehicle, an engine condition, a position of the track rod, a speed of the track rod, an acceleration of the track rod, a rotation angle of a steering column, a rotational speed and/or a rotational acceleration of the steering column. In addition, effects caused by gimbal joints in the steering system can be taken into account.

Alternatively, the second virtual magnet is provided as a permanent magnet. In particular, the second virtual magnet again has predefined magnetic properties, which are in particular fixed.

Magnetic properties of the first virtual magnet can be determined based on the operating parameters of the motor vehicle, in particular the steering system. In addition, effects caused by gimbal joints in the steering system can be taken into account. As a result, the control feel can be adjusted according to the driving situation.

In another aspect, the first and second virtual magnets are assigned to a common steerable wheel of the motor vehicle. The first and second virtual magnets thus form a first virtual magnet pair. There may be additional virtual magnet pairs, each of which is assigned to a common wheel, wherein a maximum of one virtual magnetic pair per wheel is provided. The other virtual magnetic pairs may have at least partially the same magnetic properties as the first virtual magnetic pair.

According to another aspect, the first virtual magnet is provided on a steering gear and the second virtual magnet is provided on a track rod. Depending on the position of the second virtual magnet and the magnetic properties of the first virtual magnet, the control feel can be influenced depending on the situation.

For example, the second virtual magnet is placed near a mechanical stop of the track rod and the magnetic properties of the first virtual magnet are selected in such a way that the two virtual magnets repel each other. The larger the steering deflection, the closer the two virtual magnets approach and the greater the repulsive force that the two virtual magnets exert on each other. In this embodiment of the invention, a gentle virtual stop is realized, which limits steering movements. Mechanical stops are loaded to a lesser extent and are thus protected.

Alternatively, the first virtual magnet is provided on the steering gear, and the second virtual magnet is provided on a rack. In particular, the second virtual magnet is placed on the rack in such a way that the first and second virtual magnets are located in the same place in a central position of the rack (i.e. in a position in which the steering wheel is not rotated), wherein the magnetic properties of the first virtual magnet are chosen in such a way that the first and second virtual magnets attract each other if the rack is not in the central position. Thus, if the rack is not in the central position, a restoring force acts on the rack and thus also on the steering wheel. This gives the driver some haptic feedback about the central position of the steering wheel. It may be provided that the first virtual magnet will be switched off if at least one operating variable exceeds a predefined limit or if continuous steering is detected. The operating variable is, for example, a position of the track rod, a speed of the track rod, an acceleration of the track rod, a position of the rack, a speed of the rack, an acceleration of the rack, a rotation angle of the steering column, a rotational speed and/or a rotational acceleration of the steering column.

Another aspect provides that the first virtual magnet is provided spaced apart from a wheel assigned to it in relation to the longitudinal direction of the motor vehicle, wherein the first virtual magnet is substantially at the same transverse distance from the longitudinal axis of the motor vehicle as the center of the wheel, and wherein the second virtual magnet is provided essentially in the center of the wheel. The one-dimensional, linear movement of the two virtual magnets relative to each other that is described above is replaced in this case by a one-dimensional rotation of the second virtual magnet.

BRIEF DESCRIPTION OF THE FIGURES

Further advantages and properties of the invention result from the following description and the drawings, to which reference is made. In the figures.

DETAILED DESCRIPTION

Figure 1:
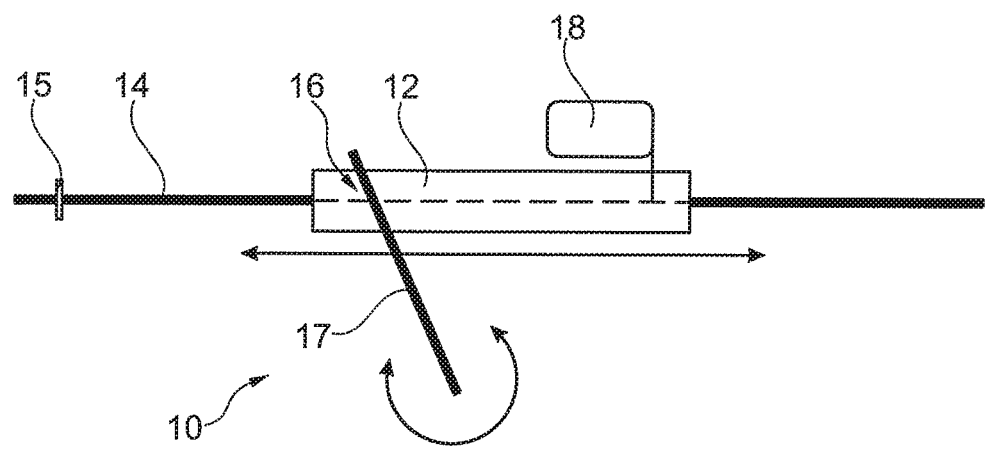
FIG. 1 shows schematically a section of a lower part of a steering system from the prior art.

In FIG. 1, a lower part 10 of a steering system from the prior art is shown schematically. The lower part 10 of the steering system includes a rack 12 and a track rod 14. The track rod 14 comprises a mechanical stop 15 that limits steering movements mechanically. More specifically, the mechanical stop 15 limits steering movements to a maximum steering deflection. A schematically indicated steering gear 16 converts a rotational movement of a steering column 17 of the steering system into a translational movement of the rack 12 (indicated by the arrows in FIG. 1) that is housed in the steering gear 16. A servo motor 18 acts on the rack 12 with a supporting force to assist the driver when steering the motor vehicle. The servo motor 18 is controlled in such a way that it supports the driver depending on the speed of the vehicle, the angle of rotation of the steering column, the torque acting on the steering column, the rotational speed of the steering column, the position of the track rod 14, the speed of the track rod 14 and/or other parameters. It should be noted that in FIGS. 1 and 2 and 5 through 7 only the region of the rack 12 between the steering gear 16 and the servo motor 18 is shown in each case.

Figure 2:
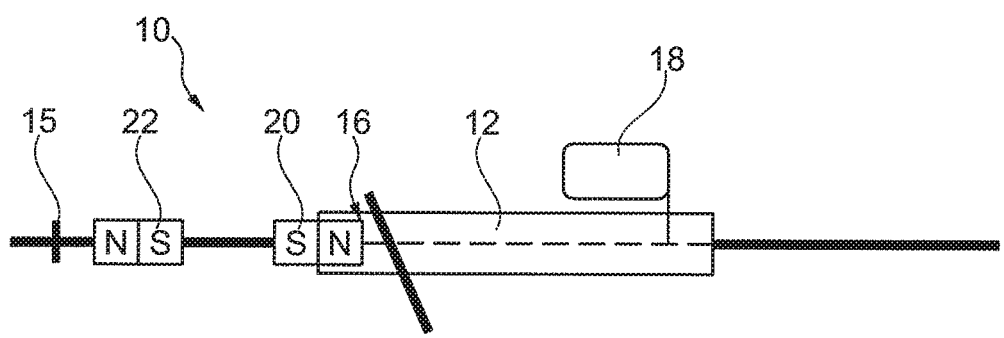
FIG. 2 shows the steering system of FIG. 1 during a step of a method according to the invention.
Figure 3:
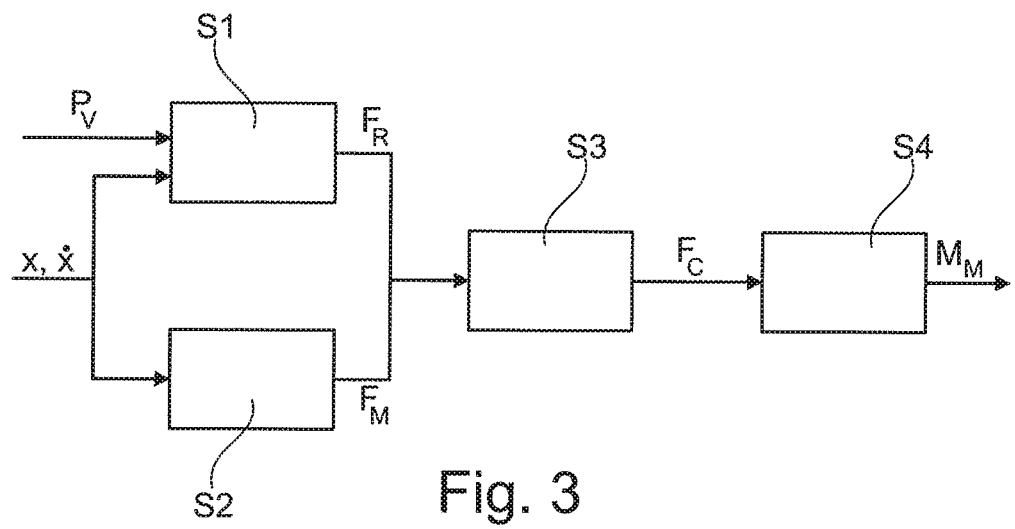
FIG. 3 a schematic flow diagram of the steps of the method according to the invention.

A method according to the invention for operating the steering system shown in FIG. 1 will now be explained in general on the basis of FIGS. 2 and 3. Examples of applications of the method will then be discussed in more detail on the basis of FIGS. 5 through 7.

First, a first virtual magnet 20 and a second virtual magnet 22 are provided mathematically in the steering system, more precisely in the lower part 10 of the steering system.

The first virtual magnet 20 is provided at a fixed position in the steering system. In the example shown in FIG. 2, the first virtual magnet 20 is placed on the steering gear 16.

The first virtual magnet 20 is in the form of an electromagnet with adjustable magnetic properties. The magnetic properties of the first virtual magnet are determined based on the operating parameters of the motor vehicle. The magnetic properties include at least one of the following variables: magnetic field strength, magnetic flux density, magnetic polarity and variables resulting from these magnetic properties, in particular magnetic energy, magnetic remanence and reluctance. The operating parameters include a speed of the motor vehicle, an acceleration of the motor vehicle, an engine condition, a position of the track rod 14, a speed of the track rod 14, an acceleration of the track rod 14, a rotation angle of a steering column 17, a rotational speed and/or a rotational acceleration of the steering column 17. In addition, effects caused by gimbal joints in the steering system can be taken into account. The second virtual magnet 22 is provided mathematically at a variable position in the lower part 10 of the steering system, wherein the variable position is determined based on the aforementioned operating parameters of the motor vehicle. In particular, the second virtual magnet 22 is movable along a predefined one-dimensional path.

The second virtual magnet 22 can be in the form of a virtual electromagnet or a virtual permanent magnet. Furthermore, the second virtual magnet 22 has predefined magnetic properties, which are in particular fixed.

If the second virtual magnet 22 is in the form of a virtual electromagnet, the first virtual magnet can also be in the form of a permanent magnet.

The further steps of the method are explained below using FIG. 3.

Based on the operating parameters (represented in FIG. 3 by $P_V$) of the motor vehicle described above, in particular the steering system, a setpoint force $F_R$ to which the lower part 10 of the steering system is subjected is estimated (step S1). In addition, the position of the second virtual magnet 22 and the magnetic properties of the first virtual magnet 20 are determined based on the operating parameters. A controller of the steering system provides data on the position x and the speed of $\dot{x}$ of the track rod 14 for calculation of the setpoint force $F_R$, the position of the second virtual magnet 22 and the magnetic properties of the first virtual magnet 20.

In addition, a virtual magnetic force $F_M$ is determined that the virtual magnets 20, 22 exert on each other (step S2). In particular, a controller of the steering system provides data on the position x and the speed $\dot{x}$ of the track rod 14 for the calculation of the magnetic force $F_M$.

A differential force $\Delta F = F_R - F_M$ is determined from the estimated setpoint force $F_R$ and the specified virtual magnetic force $F_M$. Based on the differential force $\Delta F$, an auxiliary force $F_C$ is now determined (step S3), with which the servo motor 18 acts on the lower part 10 of the steering system in the form of a motor torque $M_M$ (step S4).

Figure 4:
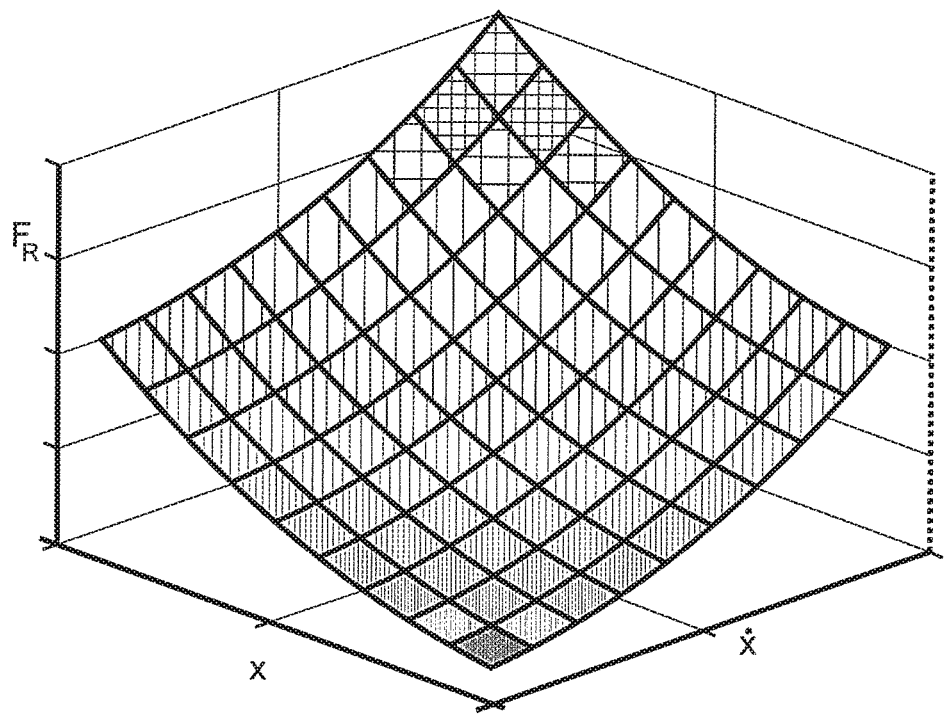
FIG. 4 an exemplary diagram of a setpoint force plotted against position and speed.

FIG. 4 shows an example diagram of a calculation of the setpoint force $F_R$ based on two operating parameters, namely the position x and the speed $\dot{x}$ of the track rod 14. In the example shown, the setpoint force $F_R$ is determined according to the formula $$F_R = \frac{x^2}{cm^2}N + \frac{\dot{x}^2}{cm^2/s^2}N.$$

It should be noted that this calculation is merely an example for illustration, from which the actual calculation of the setpoint force $F_R$ may of course differ.

Figure 5:
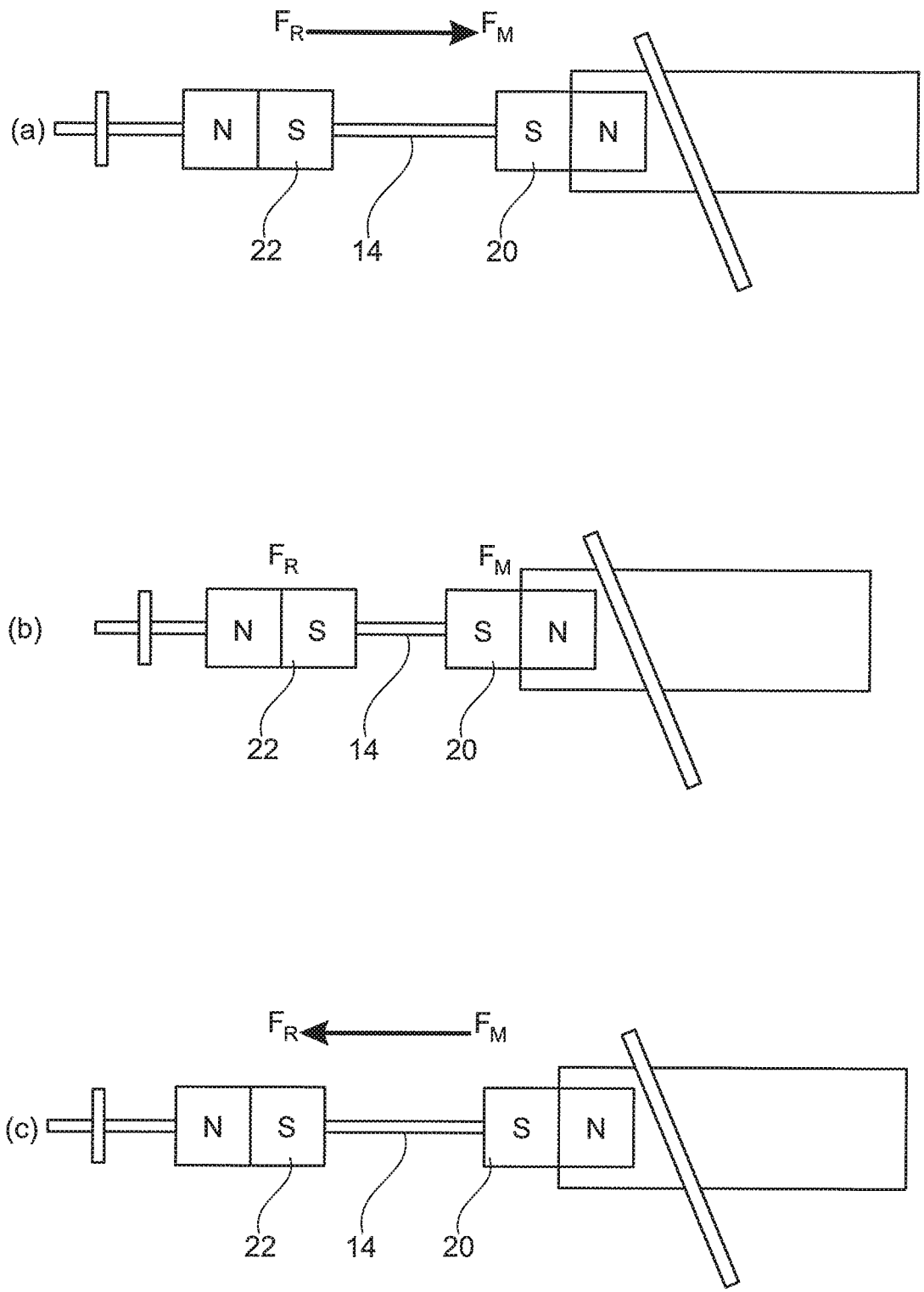
FIGS. 5 (a) through (c) show a first application example of the method according to the invention.

In FIGS. 5 (a) through (c), a first application example of the method described above is shown schematically. The second virtual magnet 22 is placed on the track rod 14 near the mechanical stop 15, wherein the second virtual magnet is movable with the track rod 14. In other words, the second virtual magnet 22 follows the movements of the track rod 14.

The two virtual magnets 20, 22 are arranged so that their south poles are opposite each other. Thus, the two magnets repel each other. In this application example, a virtual stop for limiting the maximum steering deflection is realized by the virtual magnets 20, 22, wherein the virtual stop is placed near the mechanical stop 15.

FIG. 5 (a) shows the case in which the track rod 14 is moving towards a maximum deflection. The second virtual magnet 22 approaches the first virtual magnet 20 as long as the force $F_R$ acting on the track rod 14 is greater than the virtual magnetic force $F_M$ with which the two virtual magnets 20, 22 repel each other. The magnetic force $F_M$ increases until it is equal and opposite to the force $F_R$, causing the track rod 14 to come to a standstill, see FIG. 5(b). Due to the targeted, steady increase in the magnetic force, $F_M$ a soft virtual stop is realized, which protects the mechanical stop 15.

Once the speed of the track rod 14 is zero, the first virtual magnet 20, which is in the form of an electromagnet, can be switched off. Alternatively, the magnetic flux density of the first virtual magnet 20, as shown in FIG. 5 (c), can be increased so that the magnetic force $F_M$ is greater than the setpoint force $F_R$. The track rod 14 is thus pushed towards a central position. In other words, a restoring function is realized, the speed, duration and position of which can be adjusted by means of the magnetic properties of the first virtual magnet 20.

Figure 6:
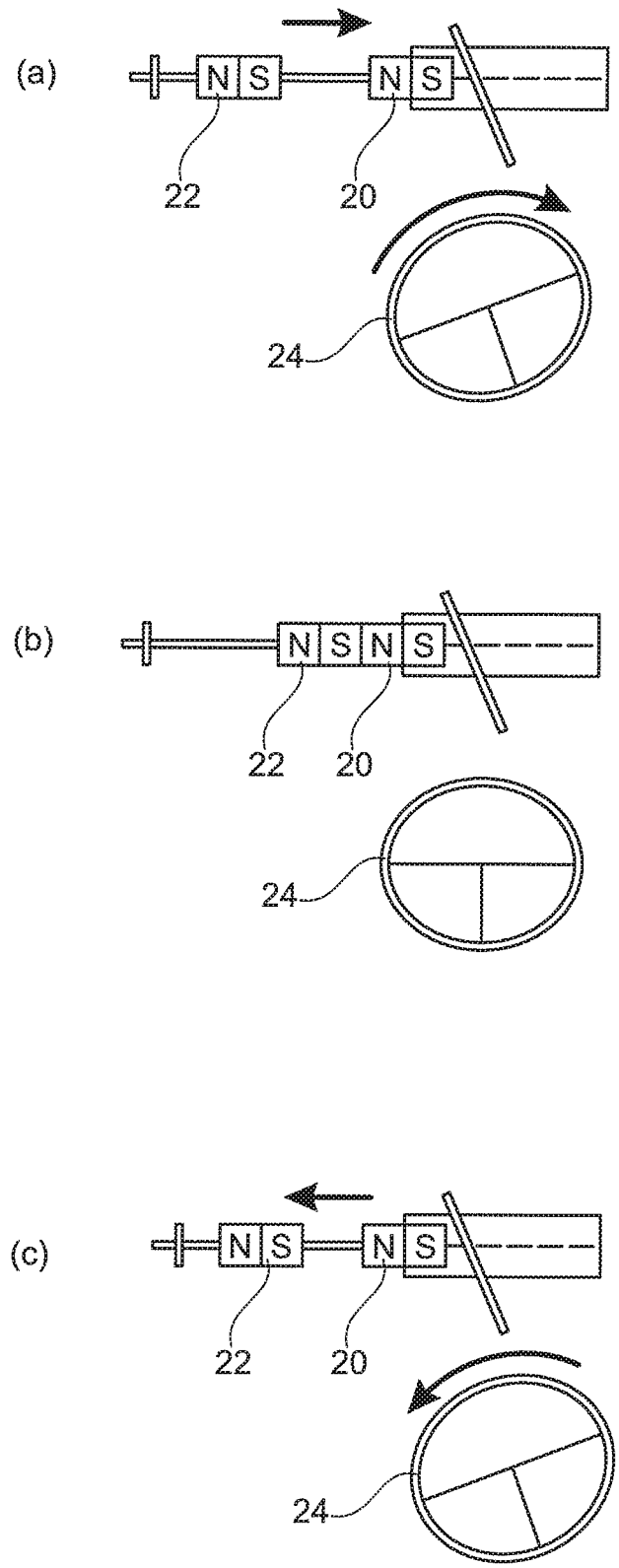
FIGS. 6 (a) through (c) show a second application example of the method according to the invention.

FIGS. 6 (a) through (c) show schematically a second application example of the described method. The two virtual magnets 20, 22 are arranged in such a way and the magnetic properties of the first virtual magnet 20 are chosen in such a way that they attract each other. More specifically, the first virtual magnet 20 is placed on the steering gear 16, while the second virtual magnet 22 is firmly placed at the location on the rack 12 that corresponds to the central position of the steering wheel 24.

FIG. 6 (a) shows a situation in which the steering wheel 24 is turned counterclockwise compared to its central position. Since the first and the second virtual magnets 20, 22 attract each other, the rack 12 and thus also the track rod 14 are acted on by a magnetic force towards the central position and the first and the second virtual magnets 20, 22 move towards each other.

In FIG. 6 (b) the steering wheel 24 and thus also the rack 12 are in the central position. As long as the rack 12 is exactly in the central position, the first virtual magnet 20 is switched off, so that no magnetic force is now acting. As soon as the rack 12 moves from the central position, for example due to a steering movement of the driver, the first virtual magnet 20 is switched on again in the simulation and a restoring force acts on the rack 12 towards the central position (see FIG. 6 (c)). The restoring force provides the driver with haptic feedback when the steering wheel 24 moves out of the central position.

If at least one operating variable exceeds a certain predefined value or if continuous steering is detected, it may be provided that the first virtual magnet 20 is deactivated, so that no restoring force is now acting towards the central position. The operating variable is, for example, a position of the track rod 14, a speed of the track rod 14, an acceleration of the track rod 14, a position of the rack 12, a speed of the rack 12, an acceleration of the rack 12, a rotation angle of the steering column 17, a rotational speed and/or a rotational acceleration of the steering column 17.

Figure 7:
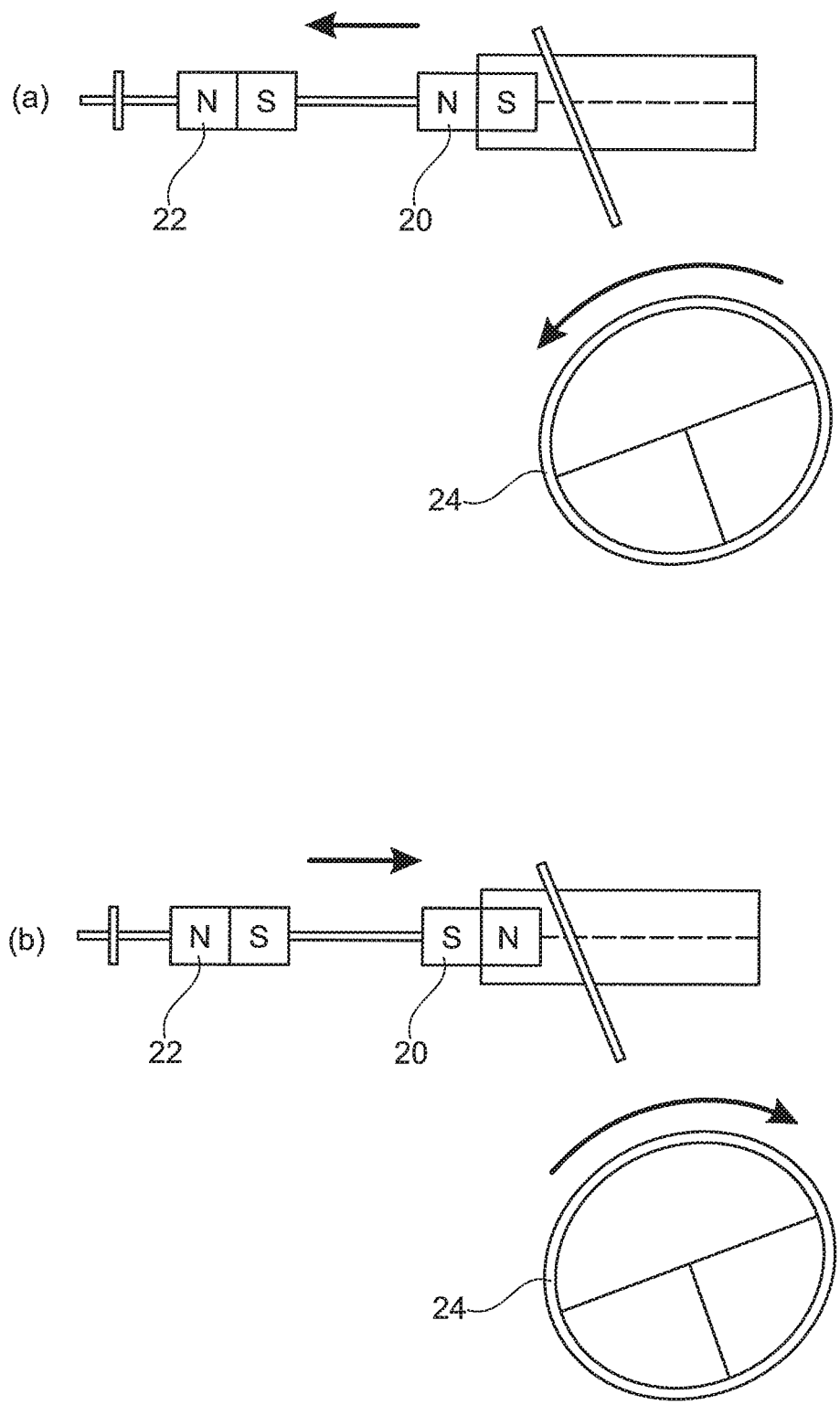
FIGS. 7 (a) and (b) show a third application example of the method according to the invention.

FIGS. 7 (a) and (b) show schematically a third application example of the described method. The first virtual magnet 20 is placed on the steering gear 16, while the second virtual magnet 22 is provided on the track rod 14.

If high steering speeds occur, i.e. high speeds $\dot{x}$ of the track rod or high rotational speeds $\dot{\delta}$ of the steering angle (equivalent to the average wheel steering angle of the steered axle), it may be provided that these are controlled by means of the method described above if the respective speed exceeds a limit value $\dot{x}_{Lim}$ or $\dot{\delta}_{Lim}$.

FIG. 7 (a) shows the case in which a fast steering movement away from a central position of the steering wheel 24 occurs. The magnetic properties of the first virtual magnet 20 are then chosen in such a way that the two virtual magnets 20, 22 attract each other. This exerts a virtual magnetic restoring force on the track rod 14 and the steering movement will be damped.

FIG. 7 (b) shows the case of a fast steering movement towards a central position of the steering wheel 24. The magnetic properties of the first virtual magnet 20 are then chosen in such a way that the two virtual magnets 20, 22 repel each other in the simulation. This exerts a repelling virtual magnetic force on the track rod 14 and the steering movement will again be damped.

The method described can also be used to adjust the position of the rack 12 correctly. If the driver turns the steering wheel 24 by a certain angle of rotation, this angle of rotation is definitely assigned a certain position of the rack 12 and thus clearly a certain steering angle δ. Each pair of values, consisting of a steering angle δ and a steering rotational speed $\dot{\delta}$, is assigned a force $F_D$ that the driver applies to the lower part 10 of the steering system by means of the steering wheel 24. The position of the second virtual magnet 22 and the magnetic properties are then selected in such a way that the virtual force exerted by the two virtual magnets 20, 22 on each other forces the rack 12 to a position corresponding to the rotation angle of the steering wheel 24. The virtual magnetic force is calculated according to the formula $F_M = F_R - F_D(\delta, \dot{\delta})$. This method can also be used in so-called steer by wire systems where there is no effective mechanical connection between the steering wheel 24 and the lower part 10 of the steering system.

Figure 8:
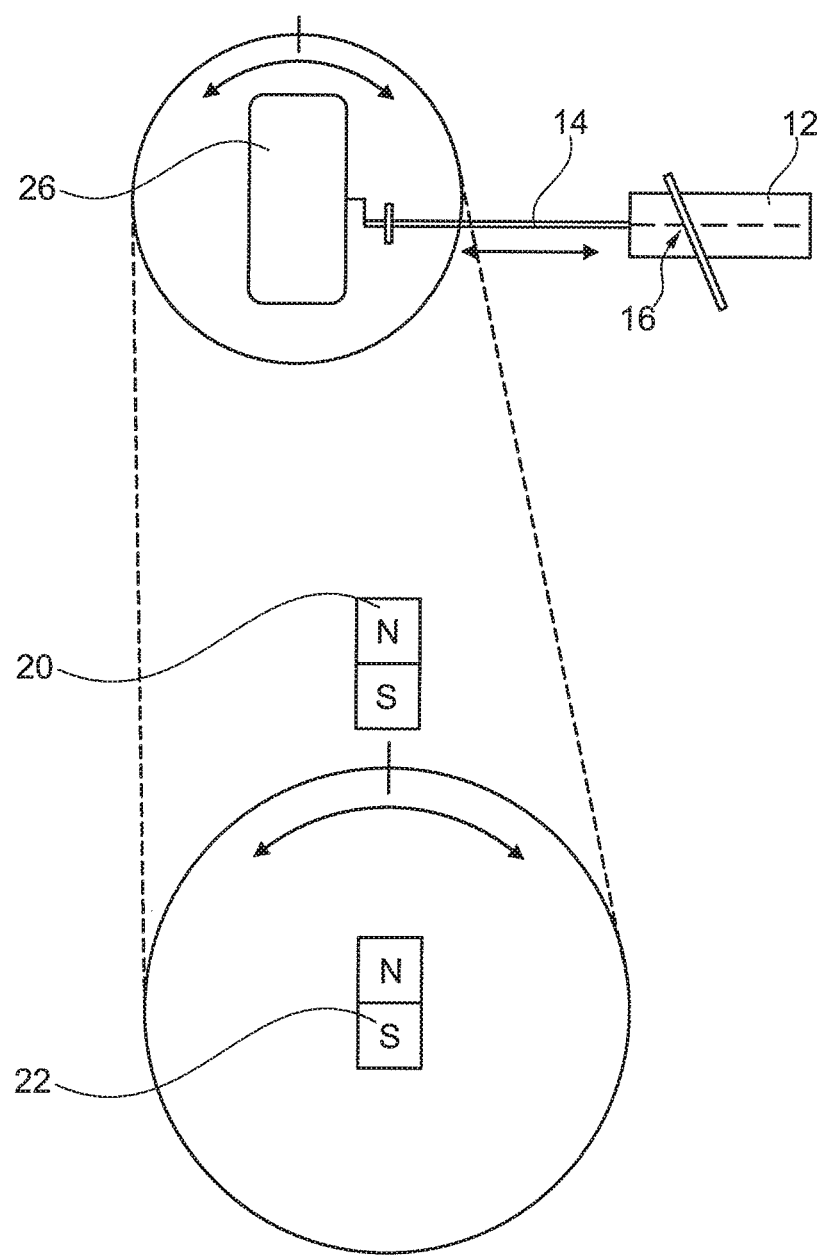
FIG. 8 shows the steering system of FIG. 1 during a step of a method according to the invention according to an alternative embodiment.

FIG. 8 shows an alternative application of the method described. The first virtual magnet 20 is spaced apart from a wheel 26 assigned relative to the longitudinal direction of the motor vehicle. The first virtual magnet 20 is at essentially the same transverse distance from the longitudinal axis of the motor vehicle as the center of the wheel 26. The second virtual magnet 22 is provided on the wheel 26 essentially in the center of the wheel 26. Instead of the one-dimensional, linear motion of the second virtual magnet 22 in the arrangement shown in FIG. 8, there is a one-dimensional rotational movement of the second electromagnet 22.

In the case shown in FIG. 8, similarly to the case discussed on the basis of FIGS. 6 (a) through (c), the two virtual magnets 20, 22 cause a restoring force towards a central position of the wheel 26. Due to the mechanical coupling of the wheel 26 with the track rod 14 and thus with the steering gear 16, this provides the driver with haptic feedback about the central position of the steering wheel 24.

Likewise, in this embodiment of the method, it is possible by a suitable choice of the magnetic properties of the first virtual magnet 22, similarly to the above descriptions to damp fast steering movements away from a central position (the two virtual magnets 20, 22 attract each other) or towards a central position (the two virtual magnets repel each other).

In general, in the application of the method shown in FIG. 8, by a suitable choice of the magnetic properties of the first virtual magnet 20 all the application examples described above for the two virtual magnets 20, 22 that can be moved linearly relative to each other can be implemented. In this variant, the method can be compared with the position control of an electric motor. The second virtual magnet 22 corresponds to the rotor and the first virtual magnet corresponds to the stator. By means of targeted virtual energization, the rotational position of the second virtual magnet 22 (and thus of the wheel 26) can be set in the virtual magnetic field of the first virtual magnet.

The invention claimed is:

1. A method for operating a steering system of a motor vehicle with the following steps:
    provide for at least one first and one second virtual magnet in the steering system of the motor vehicle, the first and second virtual magnets being provided only mathematically in the steering system;
    determine a virtual magnetic force that the multiple virtual magnets exert on each other;
    estimate a setpoint force to be applied to a lower part of the steering system; and
    determine an auxiliary force exerted on the lower part of the steering system by a servo motor from the determined virtual magnetic force and the estimated setpoint force.

2. The method as claimed in claim 1, wherein the first virtual magnet is mathematically provided at a fixed position in the steering system.

3. The method as claimed in claim 1, wherein the second virtual magnet is mathematically provided at a variable position in the steering system.

4. The method as claimed in claim 3, wherein the variable position of the second virtual magnet is determined based on operating parameters of the motor vehicle.

5. The method as claimed in claim 1, wherein a virtual electromagnet is used as the first virtual magnet.

6. The method as claimed in claim 1, wherein a virtual electromagnet is used as the second virtual magnet.

7. The method as claimed in claim 1, wherein a virtual permanent magnet is used as the second virtual magnet.

8. The method as claimed in claim 1, wherein magnetic properties of the first virtual magnet are determined based on operating parameters of the motor vehicle.

9. The method as claimed in claim 1, wherein the first virtual magnet and the second virtual magnet are mathematically assigned to a common wheel of the vehicle.

10. The method as claimed in claim 1, wherein the first virtual magnet is mathematically provided on a steering gear and that the second virtual magnet is mathematically provided on a track rod.

11. The method as claimed in claim 1, wherein the first virtual magnet is mathematically provided on a steering gear and that the second virtual magnet is mathematically provided on a rack.

12. The method as claimed in claim 1, wherein the first virtual magnet is mathematically provided spaced apart from an associated wheel relative to the longitudinal direction of the motor vehicle, wherein the first virtual magnet is at essentially the same transverse distance from the longitudinal axis of the motor vehicle as the center of the wheel, and wherein the second virtual magnet is mathematically provided essentially at the center of the wheel.

13. The method as claimed in claim 1, wherein the first virtual magnet is a virtual electromagnet and the second virtual magnet is a virtual electromagnet or a virtual permanent magnet.

14. A method for operating a steering system of a motor vehicle with the following steps:
    provide for at least one first and one second virtual magnet in the steering system of the motor vehicle, the first virtual magnet being provided spaced apart from an associated wheel relative to the longitudinal direction of the motor vehicle, the first virtual magnet being at essentially the same transverse distance from the longitudinal axis of the motor vehicle as a center of the wheel, the second virtual magnet being provided essentially at the center of the wheel;

determine a virtual magnetic force that the multiple virtual magnets exert on each other;

estimate a setpoint force to be applied to a lower part of the steering system; and determine an auxiliary force exerted on the lower part of the steering system by a servo motor from the determined virtual magnetic force and the estimated setpoint force.

15. The method as claimed in claim 14, wherein magnetic properties of the first virtual magnet are determined based on operating parameters of the motor vehicle.

16. A method for operating a steering system of a motor vehicle with the following steps:

provide for at least one first and one second virtual magnet in the steering system of the motor vehicle, the first and second virtual magnets being non-physical, simulated magnets;

determine a virtual magnetic force that the multiple virtual magnets exert on each other;

estimate a setpoint force to be applied to a lower part of the steering system; and determine an auxiliary force exerted on the lower part of the steering system by a servo motor from the determined virtual magnetic force and the estimated setpoint force.

17. The method as claimed in claim 16, wherein the first virtual magnet is simulated to be at a fixed position in the steering system.

18. The method as claimed in claim 16, wherein the second virtual magnet is simulated to be at a variable position in the steering system.

19. The method as claimed in claim 18, wherein the variable position of the second virtual magnet is determined based on operating parameters of the motor vehicle.

20. The method as claimed in claim 16, wherein the first virtual magnet is a virtual electromagnet and the second virtual magnet is a virtual electromagnet or a virtual permanent magnet.

* * * * *